(12) United States Patent
Rehm et al.

(10) Patent No.: US 8,213,140 B2
(45) Date of Patent: Jul. 3, 2012

(54) APPARATUS AND METHOD FOR OPERATION OF AN ELECTRICAL MACHINE FOR DRIVING A MOTOR VEHICLE

(75) Inventors: Lothar Rehm, Herrenberg (DE); Thomas von Raumer, Stuttgart (DE)

(73) Assignee: Daimler A.G., Stuttgart (DE)

( * ) Notice: Subject to any disclaimer, the term of this patent is extended or adjusted under 35 U.S.C. 154(b) by 598 days.

(21) Appl. No.: 12/288,318

(22) Filed: Oct. 17, 2008

(65) Prior Publication Data

US 2009/0097171 A1  Apr. 16, 2009

Related U.S. Application Data

(63) Continuation-in-part of application No. PCT/EP2007/003347, filed on Apr. 17, 2007.

(30) Foreign Application Priority Data

Apr. 19, 2006  (DE) .......................... 10 2006 018 054

(51) Int. Cl.
*H02H 3/00* (2006.01)
(52) U.S. Cl. ........................................................ 361/51

(58) Field of Classification Search ...................... 361/51
See application file for complete search history.

(56) References Cited

U.S. PATENT DOCUMENTS

| 4,475,150 | A | * | 10/1984 | D'Atre et al. .................... 363/51 |
|---|---|---|---|---|
| 5,745,356 | A | * | 4/1998 | Tassitino et al. ................. 363/71 |
| 5,808,846 | A | * | 9/1998 | Holce et al. .................. 361/93.6 |
| 5,914,582 | A | * | 6/1999 | Takamoto et al. ............ 318/801 |
| 7,279,862 | B1 | * | 10/2007 | Welchko et al. .............. 318/564 |
| 2002/0084766 | A1 | * | 7/2002 | Schwesig ...................... 318/801 |
| 2003/0173839 | A1 | * | 9/2003 | Torii et al. ......................... 310/52 |
| 2004/0232793 | A1 | * | 11/2004 | Fujita et al. .............. 310/156.43 |
| 2008/0304189 | A1 | * | 12/2008 | Tang et al. ....................... 361/33 |

FOREIGN PATENT DOCUMENTS

| JP | 03 089879 | 4/1991 |
|---|---|---|
| JP | 11 262283 | 9/1999 |

* cited by examiner

*Primary Examiner* — Jared Fureman
*Assistant Examiner* — Scott Bauer
(74) *Attorney, Agent, or Firm* — Klaus J. Bach

(57) ABSTRACT

In an apparatus and method for the operation of an electrical machine, the electrical machine is connected to an external controller via a direct switch-off line and is rapidly switched off when the external controller identifies a fault in order to prevent an electrical machine from being operated in-correctly.

7 Claims, 2 Drawing Sheets

APPARATUS AND METHOD FOR OPERATION OF AN ELECTRICAL MACHINE FOR DRIVING A MOTOR VEHICLE

This is a Continuation-in-Part application of pending international patent application PCT/EP2007/003347 filed Apr. 17, 2007 and claiming the priority of German patent application 10 2006 018 054.2 filed Apr. 19, 2007.

BACKGROUND OF THE INVENTION

The invention relates to an apparatus and a method for the operation of an electrical machine including a control system, with an external control device.

DE 102 05 963 A1 discloses a method and a drive system for driving a machine with permanent-magnet excitation, in which each phase of the electrical machine has an associated half-bridge arrangement with a first and a second switching element in order to supply current via an intermediate circuit. An operating state of a drive system is monitored and is compared with a threshold value. If the threshold value is exceeded, a fault state is detected, and a short is produced between the phases of the electrical machine.

It is the principle object of the present invention to prevent an electrical machine used in a vehicle drive from being operated incorrectly.

SUMMARY OF THE INVENTION

In an apparatus and method for operating an electrical machine, the electrical machine is connected to an external controller via a switch-off line and is switched off when the external controller identifies a fault in order to prevent the electrical machine from being operated incorrectly.

It is possible for the external controller to switch off the electrical machine when the external controller identifies that a fault which is relevant for the drive of the electrical machine has occurred. In this case, the reference considers only those deviations from the nominal values, signal detection or signal transmission errors, mismatches or limit-value overshoots as faults which are relevant for the drive for the electrical machine, that is to say which can lead to undesirable consequences. Where the following text refers to a fault, then this means a fault or error in this sense.

In this way, incorrect operation of the electrical machine is prevented. For example, the electrical machine could produce an undesirably high torque or an excessive rotation speed if driven incorrectly. This could result in overloading of the electrical machine or in an undesired behavior of equipment or a vehicle driven by the electrical machine.

In accordance with the method according to the invention, the external controller is prompted to send a switch-off signal to a drive system for the electrical machine when the external controller identifies a fault. consequently, the drive system for the electrical machine receives the information about the presence of an externally identified fault, and can react accordingly.

In the simplest case, the switch-off signal acts directly on the output stage of the electrical machine which, in this document, is regarded as part of the drive system for the electrical machine. In this case, the switch-off signal can be configured such that it contains the information as to whether the output stage should produce a three-phase short or should open all the circuit breakers.

In another embodiment, the switch-off signal for the external control unit requires only that the electrical machine should be switched off. In this case, the drive system for the electrical machine decides whether the electrical machine should be switched off and what switch-off should be carried out.

The external controller may, for example, be a vehicle controller for a motor vehicle, in which the information about active running gear or traction identification relating to the wheels is processed and/or an engine controller, which coordinates the drive for the electrical machine with an internal combustion engine, and possibly with other electrical machines.

The invention will become more readily apparent from the following description thereof with reference to the accompanying drawings.

DESCRIPTION OF A PARTICULAR EMBODIMENT

Figure 1:
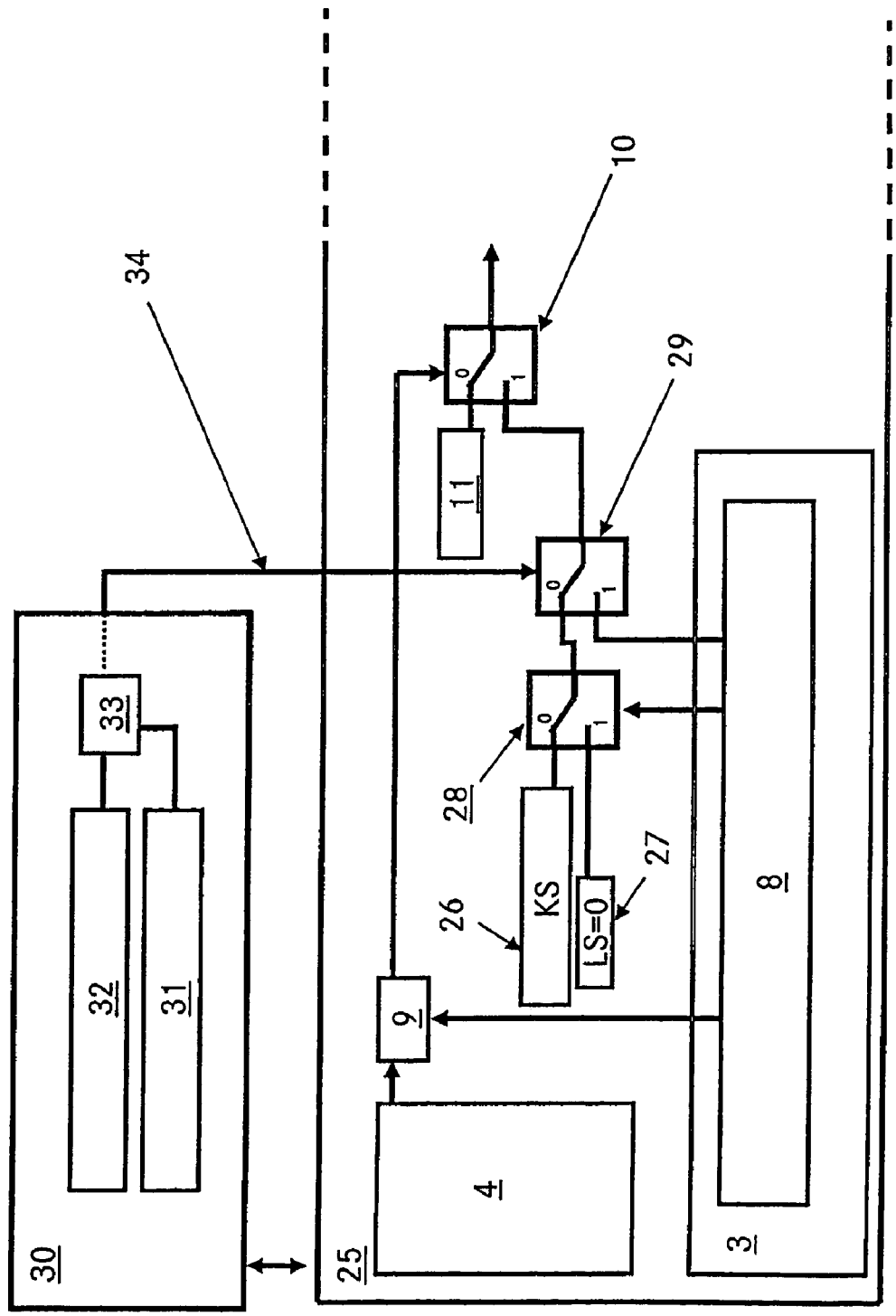
FIG. 1 shows schematically a circuit a drive system of an electrical machine, and an external controller connected thereto.

FIG. 1 shows a drive system 25 for an electrical machine 1, which is not illustrated, and an external controller 30. The external controller 30 uses a data bus or some other comparable bidirectional communication capability to interchange data with the drive system 25 for the electrical machine 1. Fault information can also be passed on in this way. However, the processes of passing on and evaluation are configured such that they are unsuitable for carrying out a fast safety switch-off.

In the embodiment illustrated in FIG. 1, the external controller 30 has a operational computer 31, a monitoring computer 32 and a logic device 33.

The logic device 33 is connected via a signal line to the operational computer 31, and is connected via a further signal line to the monitoring computer 32. If the operational computer 31 or the monitoring computer 32 identifies a fault which is relevant for driving the electrical machine 1, then it sends a fault signal to the logic device 33 via the signal line associated with it.

The logic device 33 for the external controller 30 is connected to the drive system 25 via a switch-off path 34. The logic device 33 passes a switch-off signal via the switch-off path 34 to the drive system 25 for the electrical machine 1 when at least one of the operational computer 31 and the monitoring computer 32 identifies a fault.

A part of the switch-off path 34 is shown by a dotted line. The intent of this is to show that it is also possible for the output signal from the logic device 33 to be pre-processed or processed further between the output of the logic device 33 and the output of the external controller 30.

Since the switch-off signal from the external controller 30 is passed to the drive system 25, the switch-off reaction which is initiated by the external controller 30 can be integrated in a switch-off path for the drive system 25.

Since a separate switch-off path 34 is provided, this allows the electrical machine to react quickly to an externally identified fault. For this purpose, the switch-off path preferably has a transmission rate which is fast in comparison to the other data transmission between the external controller 30 and the drive system 25. The route of the switch-off path 34 is preferably chosen so as to avoid unnecessary diversions, for example via the operational computer 3 for the drive system 25.

Figure 2:
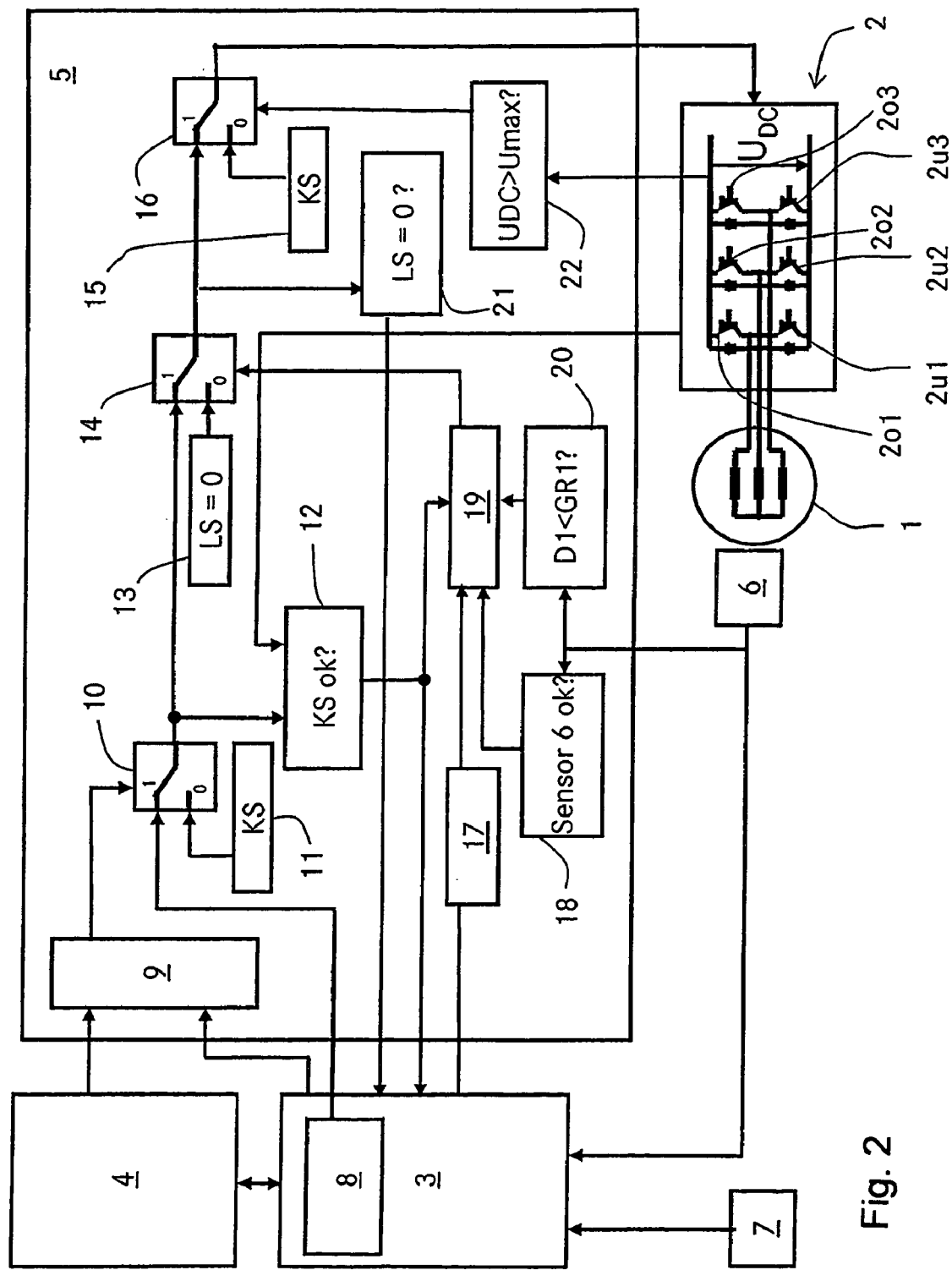
FIG. 2 shows schematically a circuit of a drive system in conjunction with an electrical machine with permanent-magnet excitation.

The drive system 25 for the electrical machine 1 is illustrated only incompletely in FIG. 1, as is indicated by the dashed-line boundary. It has an operational computer 3, a monitoring computer 4 and various logic devices 9, 10, 11, 26, 27, 28, 29. As illustrated in FIG. 2, these logic devices 9, 10, 11, 26, 27, 28, 29 may be arranged in a logic module 5.

In the embodiment illustrated in FIG. 1, the logic device 33 for the external controller is connected directly or indirectly to a switching device 29 for the drive system 25.

The switching device 29 uses the switch-off signal transmitted via the switch-off line 34 from the external controller 30 to select a switch position, which is referred to as the 0-position or a switch position which is referred to as the 1-position. The two states are likewise represented by different signal types or different signal levels.

By way of example, this switching process, which is dependent on the switch-off signal, is carried out in such a way that two different states are represented, thus distinguishing between whether a switch-off signal is or is not present. If there is no switch-off signal from the external controller 30 on the switch-off line 34, then the control element 29 is in a 1-position and connects a subarea 8 of the operational computer 30 to a switching device 10.

If a switch-off signal from the external controller 30 is present on the switch-off line 34, then the control element 29 is in a 0-position and connects a switching device 28 for monitoring computer 4 to a switching device 10. As is illustrated in FIG. 2, the switching device 10 in the end passes on the information provided by the switching device 28 to an output stage 2 of the electrical machine 1, in order to switch off the electrical machine. This allows the electrical machine to be switched off when an external control unit identifies a fault, even though the drive for the electrical machine has not itself identified a fault. This increases the fault identification rate and protects the electrical machine better against being operated incorrectly.

The switching device 28 supplies the information for a three-phase short (KS) when it is in the 0-position 0. It provides the information for opening all the circuit breakers in the output stage 2 of the electrical machine 1 (LS=0) when the switching device 28 is in the 1-position.

The switching device 28 is connected via a control line to the sub area 8 of the operational computer 3. The switching device 28 assumes the 0-position or the 1-position depending on the signal that is present on this control line. A switching-off process can therefore be carried out by means of a three-phase short or by opening all the circuit breakers in the output stage 2, depending on the information from the operational computer 3. This decision can be made, for example, as a function of whether the operational computer 3 identifies that a detected rotation speed is less than an associated limit value.

As is indicated in FIG. 1, the drive system 25 is also able to initiate a switch-off of the electrical machine 1, and to carry this out, independently of an external controller 30. By way of example, this is shown in FIG. 2 for switching off a machine with permanent-magnet excitation. In this case, the embodiment illustrated in FIG. 2 is designed such that the switched-off machine 1 does not produce any significant braking torque.

FIG. 2 shows schematically a circuit of a drive system in conjunction with an electrical machine 1 with permanent-magnet excitation.

The electrical machine 1 is connected to an output stage 2. The output stage 2 may be in the form of a converter. The illustrated output stage 2 has three upper switching elements 2o1, 2o2, 2o3 and three lower switching elements 2u1, 2u2, 2u3. The switching elements are typically formed by circuit breakers. The switching elements form three half-bridge arrangements, which are each formed from two of the switching elements 2o1, 2u1; 2o2, 2u2 and 2o3, 2u3, and each drive one of the three phases of the electrical machine 1.

The output stage 2 is connected via a main contactor, which is not illustrated in FIG. 1, to a supply device, which is likewise not illustrated in FIG. 1, for the electrical machine 1 (for example a battery). The supply device supplies the output stage 2 with a supply voltage U_DC. The supply device can be switched on and off via the main contactor.

The output stage 2 is connected to a logic module 5 and is driven by it. In addition, the output stage 2 passes on information about the supply voltage U_DC and information about correct implementation of a three-phase short to the logic module 5. Information can likewise be passed on relating to correct implementation for opening of the switching elements 2o1, 2o2, 2o3, 2u1, 2u2 or 2u3 or relating to a voltage U_CE of a switching element 2o1, 2o2, 2o3, 2u1, 2u2 or 2u3 to the logic module 5.

The logic module 5 is connected to an operational computer 3 and to a monitoring computer 4 and receives data from them. The operational computer 3 and the monitoring computer 4 are likewise connected to one another and interchange data with one another. In this case, the monitoring computer 4 monitors that the operational computer 3 is operating correctly.

The operational computer 3 receives information from a rotation-speed sensor 6, which preferably detects a rotation speed D1 of the electrical machine 1.

Furthermore, one or more further rotation-speed sensors 7 may be provided in order to detect one or more rotation speeds D2. For example, the rotation speed of the electrical machine 1 can likewise be detected as the rotation speed D2. A rotation speed of a gearbox which is connected to the electrical machine 1, a wheel rotation speed of a vehicle wheel or some other relevant rotation speed can likewise be detected. The rotation-speed sensor 7 is preferably a wheel rotation-speed sensor for a vehicle wheel in an electronic stability program.

In FIG. 2, the rotation-speed sensor 7 is connected to the operational computer 3. The operational computer 3 receives information from the rotation-speed sensor 7 about the detected rotation speed D2 via this connection.

The operational computer 3 has an area 8. This area 8 is referred to as the first level, in a two-level monitoring system or in a three-level monitoring system. In this case, the first level is monitored by a second level, and possibly a third level. The instantaneous drive signals for driving the electrical machine 1 are calculated in the area 8 of the operational computer 3. These drive signals are passed on from the area 8 of the operational computer 3 to a switch 10 in the logic module 5.

The switch 10 in the logic module 5 passes on the drive signals via a control line to a switch 14 in the logic module 5. The switch 14 in the logic module 5 passes on the drive signals via a control line to a switch 16 in the logic module 5. The switch 16 in the logic module 5 passes on the drive signals via a control line to the output stage 2. The output stage 2 sets its switching elements 2o1, 2o2, 2o3, 2u1, 2u2, 2u3 as a function of the drive signals, and drives the electrical machine 1 in accordance with the drive signals.

The operational computer 3 is connected via a switch-off path to an element 9 in the logic module 5. In this case, a switch-off path is considered to be a connection via which an enable signal, or selectively, a switch-off signal can be passed on.

The monitoring computer 4 is likewise connected via a switch-off path to the element 9 of the logic module 5.

In one preferred embodiment, the switch-off signal is provided in the form of a voltage-free default state. If a fault results in no signal being transmitted from the operational computer 3 or from the monitoring computer 4 to the logic module 5, then the logic module 5 interprets this as a switch-off signal.

The element 9 in the embodiment illustrated in FIG. 2 is in the form of a "logic AND". Like all the elements in the logic module 5, the element 9 may be in the form of an electronic component, may be in the form of a structure within a logic module, or may be in the form of software. When the "logic AND" 9 receives an enable signal both from the operational computer 3 and from the monitoring computer 4, it passes on an enable signal to the switch 10, otherwise it passes on a switch-off signal.

In one alternative embodiment, the element 9 is in the form of a "logic OR" or the like. In this case, the element 9 passes on a switch-off signal to the switch 10 when it receives a switch-off signal from the operational computer 3 or from the monitoring computer 4, or from both.

When the switch 10 receives a switch-off signal from the element 9, then it switches over and thus interrupts the process of passing on the drive signals calculated by the area 8 of the operational computer 3. Instead of the drive signals from the area 8, the drive signals of an element 11 of the logic module 5 are now passed on. In this case, the element 11 is typically a non-volatile memory, in which the drive signals for a three-phase short are permanently stored.

These drive signals from the element 11 are fed via the switch 10 into the control line, and are passed on via the switch 14 and the switch 16 to the output stage 2. The output stage 2 sets its switching elements 2o1, 2o2, 2o3, 2u1, 2u2, 2u3 in accordance with the drive signal for a three-phase short, and thus produces a three-phase short in the electrical machine 1.

In this case, the drive signals may provide a three-phase short of the switching elements 2o1, 2o2, 2o3 or of the switching elements 2u1, 2u2, 2u3. It is also possible to provide for a change to the respective other variant of a three-phase short when information relating to the operating state of the switching elements 2o1, 2o2, 2o3, 2u1, 2u2, 2u3 allows the conclusion that the selected three-phase short cannot be carried out, or has not been carried out, correctly.

The switch 14 is connected to an element 19. The element 19 is a logic device which sends a switch-off signal to the switch 14 when defined input data is present. In this case, the switch-off signal results in the switch 14 being switched to a switching state in which it can pass on the drive signals associated with it in order to switch off the electrical machine 1.

The element 19 is connected to the rotation-speed sensor 6 via an element 20. The element 20 receives from the rotation-speed sensor 6 information about the rotation speed D1 detected by the rotation-speed sensor 6. The rotation speed D1 is preferably a rotation speed of the electrical machine 1. The element 20 checks whether the rotation speed D1 is below a limit value GR1. In a simplified embodiment, the element 20 includes a signal being passed on to the element 19 when this is the case.

In one development of this embodiment, a check is carried out to determine whether the rotation-speed sensor 6 and the signal transmission of the value for the rotation speed D1 are operating correctly. In FIG. 1, this check is performed in an element 18. In this case, the element 19 evaluates the information supplied from the element 20 relating to the rotation speed D1 of the sensor 6 only when the element 18 additionally signals to the element 19 that the rotation-speed sensor 6 and the signal transmission of the value for D1 are operating correctly. If this is not the case, then, in one development, instead, a fixed stored rotation-speed value can be assumed.

FIG. 2 illustrates an embodiment in which the element 19 is connected via an element 17 to the operational computer 3. The element 17 receives via the operational computer 3 rotation-speed information D2 from an additional sensor 7. In this case, the element 17 can also be arranged in the operational computer 3, as an alternative to the embodiment illustrated in FIG. 1.

In one development, the element 17 passes on a signal to the element 19 only when the rotation-speed information D2 falls below the limit value GR2. In one alternative, simplified embodiment, the element 19 passes on a signal to the element 14 when this is the case.

In a particular development of this alternative embodiment, the rotation-speed information D2, which is supplied from the additional rotation-speed sensor 7 to the operational computer 3, is replaced by the rotation-speed information D1 supplied from the rotation-speed sensor 6 to the operational computer 3, when the operational computer 3 identifies a fault in the rotation-speed sensor 7 or in the data transmission from the rotation-speed sensor 7. In this case, the element 17 according to one preferred development, passes on a signal to the element 19 only when the rotation-speed information D1 detected in the operational computer 3 falls below the limit value GR1.

In one preferred embodiment, the element 19 passes a signal on to an element 14 when the elements 17 and 20 each identify that a limit value has been undershot and no information is available relating to incorrect detection or transmission of the signals which have undershot the limit value.

The drive signals which the switch 10 passes on via the control line to the switch 14 are also passed on to an element 12. The element 12 uses the drive signals from the switch 10 to identify whether a three-phase short should be initiated. The element 12 passes this information on to the operational computer 3 and to the element 19 of the logic module 5.

The element 12 is also connected to the output stage 2 and receives from the latter information about its operating state and/or about the operating state of its switching elements 2o1, 2o2, 2o3, 2u1, 2u2, 2u3. The transmission in this case typically comprises information as to whether a voltage U-CE of the switching elements 2o1, 2o2, 2o3, 2u1, 2u2, 2u3 is at a permissible value. The element 12 uses the information from the output stage 2 to identify whether the output stage 2 is producing a three-phase short in the electrical machine 1. If a three-phase short which has been implemented correctly is present, then the element 12 passes this information to the operational computer 3 and to an element 19 in the logic device 5. If a three-phase short which has been implemented incorrectly is present, then one embodiment provides for the variant of the three-phase short to change from a short of the switching elements 2o1, 2o2, 2o3, to a short of the switching elements 2o1, 2o2, 2o3, 2u1, 2u2, 2u3, or vice versa.

In the embodiment illustrated in FIG. 2, the element 19 sends a switch-off signal to the switch 14 when the element 19 receives the information that the operational computer 3 has identified, via the element 17, a rotation speed D2 or D1 below the respective limit value GR2 or GR1 associated with it, and the element 12 has identified a three-phase short of the output stage 2 and the absence of a switch-off signal from the element 9 to the switch 10. In this case, it can be assumed on the basis of the signals which are present in the element 19 that the operational computer 3 is operating correctly. The signal passed down via the element 17 can thus be trusted and if D2 or D1, respectively, undershoot the respective limit value GR2 or GR1, the switching to open switching elements 2o1, 2o2, 2o3, 2u1, 2u2, 2u3 can be initiated by sending a switch-off signal to the switch 14. This behavior can be used in order to include a switch-off command, which is supplied from an external controller, in the method, not based on fault identification by the operational computer 3 or the monitoring computer 4. It is thus also possible to initiate a three-phase short as a function of the rotation speed and/or as a function of a voltage U-DC for an external switch-off command, or to initiate a process of switching off the electrical machine by opening all the switching elements 2o1, 2o2, 2o3, 2u1, 2u2, 2u3.

In the embodiment illustrated in FIG. 2, the element 19 sends a switch-off signal to the switch 14 when the element 19 receives the information that the element 20 has identified that the rotation speed D1 is below the limit value GR1 associated with it and the element 12 has identified a three-phase short of the output stage 2 and the presence of a switch-off signal from the element 9 at the switch 10. When a switch-off signal from the element 9 is present at the switch 10, then the data from the operational computer 3 and from the monitoring computer 4 can no longer be trusted. In this situation, it is therefore worthwhile not using the rotation-speed signal which has been passed on from the operational computer 3 to the element 17, but to trust the rotation-speed signal D1 which is passed on directly from the sensor 6 to the logic module 5. A switch-off test path may be provided for monitoring a fault-free switching off of the electrical machine, by the external controller 30 under different conditions.

In this last described situation, the element 18 in the embodiment illustrated in FIG. 2 must additionally signal to the element 19 that the sensor 6 is operating correctly. If this is not the case then, instead of this, a fixed stored rotation-speed value may be assumed. This also applies to the situation in which the element 17 has changed over, as a substitute, to the rotation speed D1 and the element 18 identifies a fault in the sensor 6.

If the switch 14 receives a switch-off signal from the element 19, then it switches over and thus interrupts the process of passing on the drive signals coming from the element 10. Instead of these drive signals, the information from an element 13 is now passed on to the logic device 5. In this case, the element 13 is typically a read-only memory in which the drive signals for opening all of the switching elements 2o1, 2o2, 2o3, 2u1, 2u2, 2u3 of the output stage 2 are permanently stored.

These drive signals from the element 13 are fed into the control line via the switch 14 and are passed on via the switch 16 to the output stage 2. The output stage 2 opens its switching elements 2o1, 2o2, 2o3, 2u1, 2u2, 2u3 in accordance with the drive signals supplied to it as operating parameters, and thus drives the electrical machine 1.

The information which the switch 14 passes on via the control line to the switch 16 is also passed on to an element 21. The element 21 uses the information from the switch 14 to identify whether all the switching elements 2o1, 2o2, 2o3, 2u1, 2u2, 2u3 should be opened. This information is passed on by the element 21 to the operational computer 3.

The output stage 2 passes on information about the voltages U_CE present on it to an element 22. The element 22 is a comparator which compares the value supplied for the voltage U_CE with a value Umax, and passes on a switch-off signal to the switch 16 when U_CE is greater than Umax.

If the switch 16 receives a switch-off signal from the element 22, then it switches over and thus interrupts the process of passing on the drive signals coming from the element 14. Instead of these drive signals; the drive signals from an element 15 are now passed on to the logic device 5. In this case, the element 15 is typically a read-only memory, in which the drive signals for a three-phase short of the output stage 2 are permanently stored.

What is claimed is:

1. An apparatus for the operation of an electrical machine (1) for driving a motor vehicle including a drive system (25) with an output stage (2) having three upper circuit breakers (2o1, 2o2, 2o3) and three lower circuit breakers (2u1, 2u2, 2u3), the electrical machine (1) being switchable off by the drive system (25) and including an external controller (30) for controlling the switching of the electrical machine (1) to an off state, wherein a bidirectional communication capability is provided between the external controller (30) and the drive system (25) of the electrical machine (1) and wherein a separate switch-off line (34) is provided extending between the external controller (30) and the drive system (25) for fast transmission of a switch-off signal from the external controller (30) to the drive system (25) of the electrical machine (1), wherein, for switching off the electrical machine (1), the output stage (2) is subjected to a three-phase short circuit by shorting one of the three upper circuit breakers (2o2, 2o2, 2o3) and the three lower circuit breakers (2u1, 2u2, 2u3) when the rotation seed D1 does not fall below a definable limit value GR1 or a voltage U DC of the output stage (2) exceeds a limit value $U_{max}$; and all the circuit breakers (2o2, 2o2, 2o3, 2u1, 2u2, 2u3) of the output stage (2) are opened for switching off the electrical machine (1), when the rotation speed D1 is below the limit value GR1 and the voltage U DC of the output stage (2) does not exceed a limit value $U_{max}$.

2. The apparatus as claimed in claim 1, wherein the separate switch-off line (34) from the external controller (30) to the drive system is connected to a switching device (29) of the drive system (25) integrated in a switch-off path of, the drive system (25) of the electrical machine (1).

3. The apparatus as claimed in claim 1, wherein the external controller (30) includes an operational computer (31) and a monitoring computer (32).

4. A method for the operation of an electrical machine (1) for driving a motor vehicle, with an apparatus for operating the electrical machine (1), including a drive system (25) with an output stage (2) having a number of circuit breakers, the electrical machine (1) being switchable off by the drive system (25) and including an external controller (30) for switching off the electrical machine (1), wherein a bidirectional communication capability is provided between the external controller (30) and the drive system (25) of the electrical machine (1), and wherein a separate switch-off line (34) is provided extending between the external controller (30) and the drive system (25) for fast transmission of a switch-off signal from the external controller (30) to the drive system (25) of the electrical machine (1), said method comprising the steps of: transmitting a switch-off signal from the external controller (30) to the drive system (25) of the electrical machine (1) via the separate switch-off line (34) for initiating a three-phase short of the output stage (2) of the electrical machine (1) when the external controller (30) identifies as a fault that a rotational speed does not fall below a limit value for the detected seed, or a voltage U DC of the output stage (2) exceeds a limit value $U_{max}$ associated with the detected rotational speed, and the switch-off signal of the external controller (30) initiates the opening of all of the circuit breakers in the output stage (2) if the detected rotational speed is below the limit value associated with the detected speed and a voltage U DC of the output stage (2) does not exceed a limit value $U_{max}$ associated with the detected speed.

5. The method as claimed in claim 4, wherein the external controller (30) identifies the fault when at least one of an operational computer (31) and a monitoring computer (32) of the external controller (30) detects a fault.

6. The method as claimed in claim 4, wherein a switch-off reaction which is initiated by a switch-off signal from the external controller (30) is integrated in a switch-off path for the drive system (25).

7. The method as claimed in claim 4, wherein a switch-off path test is provided for monitoring a fault-free execution of the switching-off of the electrical machine (1) by the external controller (30) under different conditions.

\* \* \* \* \*